United States Patent [19]
Rossie et al.

[11] Patent Number: 4,503,639
[45] Date of Patent: Mar. 12, 1985

[54] GUIDANCE SYSTEM FOR WINDOW PANES OF VEHICLES

[75] Inventors: Egbert Rossie, Ingolstadt; Klaus Feucht, Gaimersheim, both of Fed. Rep. of Germany

[73] Assignee: Audi NSU Auto Union AG., Ingolstadt, Fed. Rep. of Germany

[21] Appl. No.: 474,051

[22] Filed: Mar. 10, 1983

[30] Foreign Application Priority Data

Mar. 13, 1982 [DE] Fed. Rep. of Germany ....... 3209206

[51] Int. Cl.³ .............................................. E05F 11/38
[52] U.S. Cl. ........................................ 49/374; 49/227; 49/348
[58] Field of Search ................................... 49/373–375, 49/348, 502, 227, 428

[56] References Cited

U.S. PATENT DOCUMENTS

| | | | |
|---|---|---|---|
| 3,385,000 | 5/1968 | Sturtevant et al. | 49/428 X |
| 3,703,053 | 11/1972 | DeRees et al. | 49/375 X |
| 4,417,419 | 11/1983 | Rossie et al. | 49/348 |
| 4,418,498 | 12/1983 | Wanlass et al. | 49/425 |

Primary Examiner—Kenneth Downey

[57] ABSTRACT

This invention relates to a guidance system for window panes in vehicles, comprising three points of guidance only, one of the points of guidance coinciding with the lifting mechanism. As the pane may be rotated about each one of these points of guidance, the system avoids the occurrance of bending stresses, and a function-related maximum number of degrees of freedom at each point of guidance obviates redundancy, thus providing a smooth and precise guidance of the pane.

12 Claims, 5 Drawing Figures

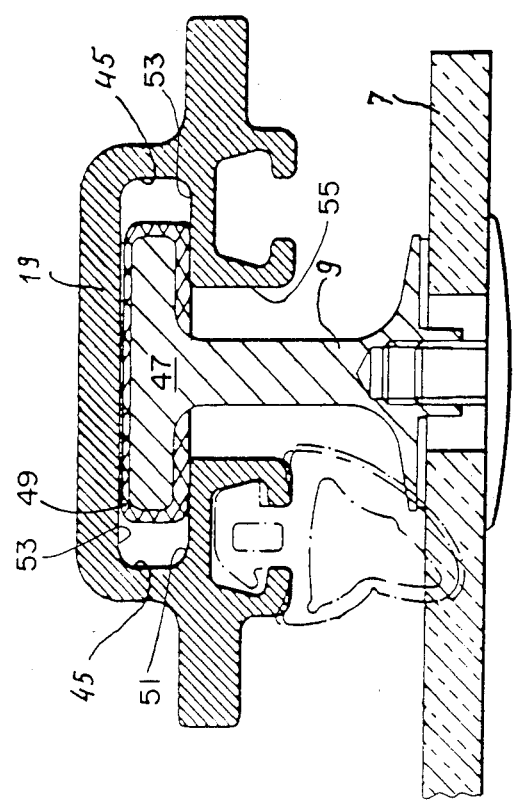
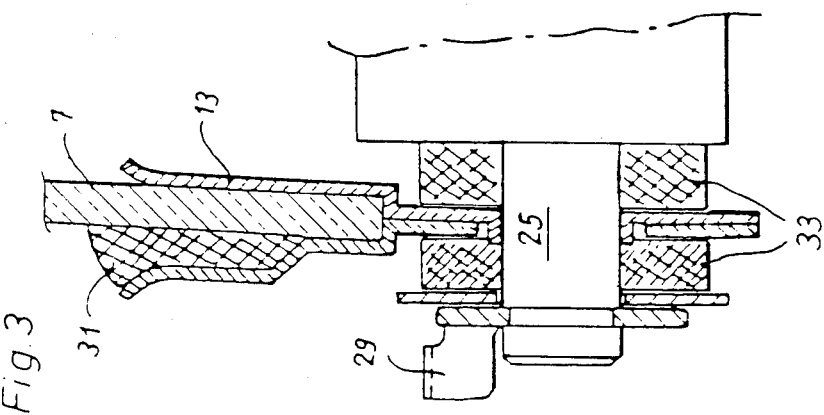

GUIDANCE SYSTEM FOR WINDOW PANES OF VEHICLES

BACKGROUND OF THE INVENTION

The invention relates to a guidance system for a window pane of a vehicle, and more particularly to such a system in which the pane may be raised and lowered in substantially vertical guide members provided within a side door of a vehicle, the pane being guided or restrained by three points of guidance in a direction at least normal to its planar dimension, i.e., in a direction transverse of the vehicle.

A guidance system of this kind in which a doubly-curved window pane is guided by three points of guidance is disclosed by German Patent Specification No.: P30 37 397.8-21. Each of the points of guidance disclosed therein is defined by a bracket adhesively secured to the pane, and each bracket is connected to a slide member. The slide members are mounted for movement in associated guide members. However, the specification teaches nothing in respect of the arrangement of the points of guidance or about the connection of a lifting mechanism to the pane.

Such guidance systems require extreme precision if they are to insure that when the pane is raised or lowered, jamming does not occur.

SUMMARY OF THE INVENTION

The problem to be solved by the present invention is to provide, with simple means, a guidance system of the kind referred to which functions in such a manner that guidance of the pane is precisely defined and that deviations in tolerances do not result in tight or difficult movability of the pane when raising or lowering it.

In accordance with the invention there is provided a guidance system for window panes in which the pane comprises three points of guidance at each one of which it is rotatable about an axis extending substantially normal to the surrounding surface of the pane. Two of these points of guidance serve to restrain the pane in a direction normal to its direction of movement, i.e., in the longitudinal direction of the vehicle. One of the points of guidance serves to restrain the pane longitudinally and transversally of the direction of the vehicle and is connected with the lifting mechanism of the pane. It provides guidance of the pane in a direction vertical of the vehicle.

The guidance system in accordance with the invention comprises only three points of guidance, including the point of attachment of the lifting mechanism with the pane, each point of guidance defining the greatest possible number of degrees of freedom relative to its function, so that there exists no redundancy in the elements guiding the pane. By contrast, the subject matter of German Patent Specification No.: P30 37 397.8-21, supra, requires —the point of attachment of the lifting mechanism included—four points of guidance, so that, particularly since each point of guidance provides guidance in several directions, there exists multiple redundancy of guidance elements. Great precision is, therefore, required in the fitting of the individual components.

In accordance with the present invention, the point of guidance connected with the lifting mechanism has one degree of freedom (rotation), the second point of guidance has two degrees of freedom (rotation as well as in the vertical direction of the vehicle), and the third point of guidance has three degrees of freedom (rotation as well as in vertical and longitudinal directions of the vehicle).

BRIEF DESCRIPTION OF THE DRAWINGS

For a fuller understanding of the nature and objects of the invention, reference should be made to the following detailed description and the drawings accompanying it, in which:

FIG. 3 is a sectional view along line III—III in FIG. 2, of the guidance of the pane;

FIG. 5 is a sectional view along line V—V in FIG. 2, of the guidance of the pane.

DESCRIPTION OF THE ILLUSTRATED EMBODIMENT

Figure 1:
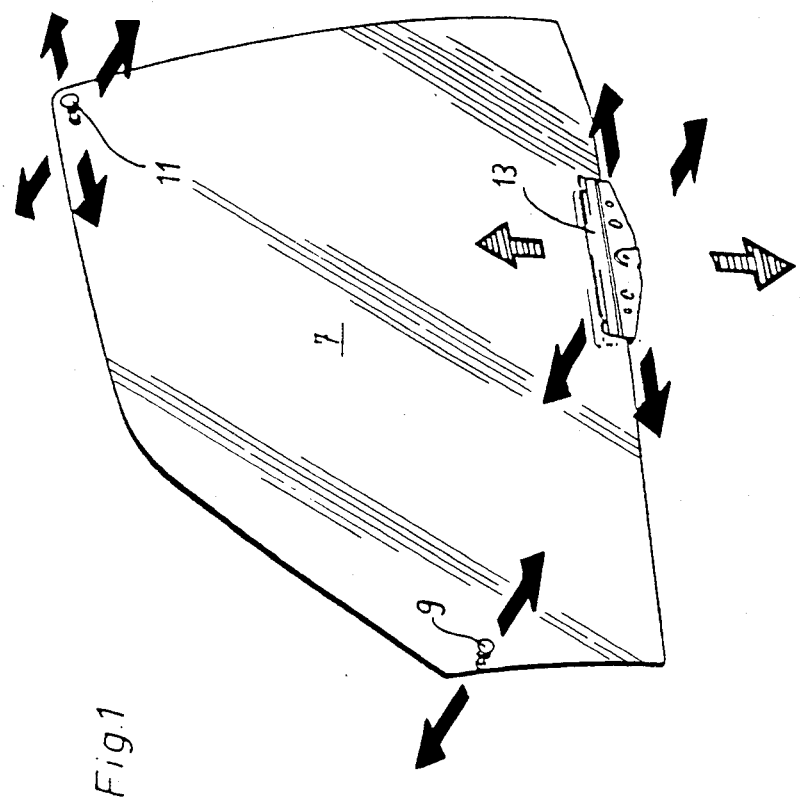
FIG. 1 depicts a window pane of the kind which may be raised and lowered in a door of a vehicle, and comprising three points of guidance, the directions in which the points of guidance are effective being indicated by arrows.
Figure 2:
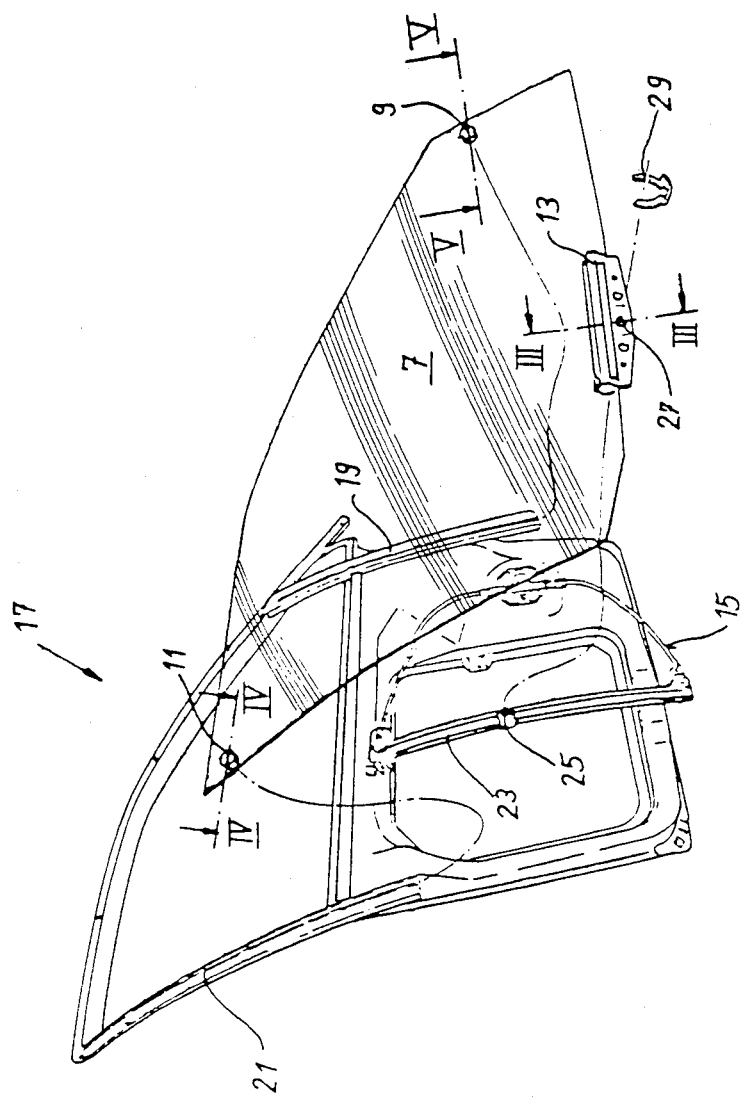
FIG. 2 is an exploded view of the pane depicted in FIG. 1, together with a door of a vehicle.

A window pane 7 is shown in FIG. 1 which is provided at its forward and rear areas with slide members 9 and 11, respectively, which constitute first and second points of guidance. At its lower margin the pane 7 is provided with a bracket 13 for connection with a lifting mechanism 15 (FIG. 2). The bracket 13 constitutes a third point of guidance.

As may be seen from FIG. 2, the pane 7 may be mounted into a side door 17 of a vehicle (not shown) for vertical movement therein. To this end there are provided two guide channels 19 and 21 in which the slide members 9 and 11, respectively, are slideably received. A third channel guide 23 is provided as a component of the lifting mechanism 15. A lug 25 is slideably mounted in the channel guide 23, and is fastened to a cable attached to a crank (not shown) by means of which the lug 25 may be raised and lowered. With the pane 7 mounted in the door 17 the lug 25 extends rotatably through a bore 27 in the bracket 13 connected to the pane 7. The lug 25 is secured in the bracket by a lock ring 29. FIG. 3 represents a sectional view through this point of attachment. Also to be seen in FIG. 3 is the attachment of the pane 7 to the bracket 13 by means of an adhesive 31, as well as an arrangement of two dampening or buffer discs or washers 33, one on each side of the bracket 13. As will be apparent to a person skilled in the art, this point of guidance has but one degree of freedom (rotation).

Figure 4:
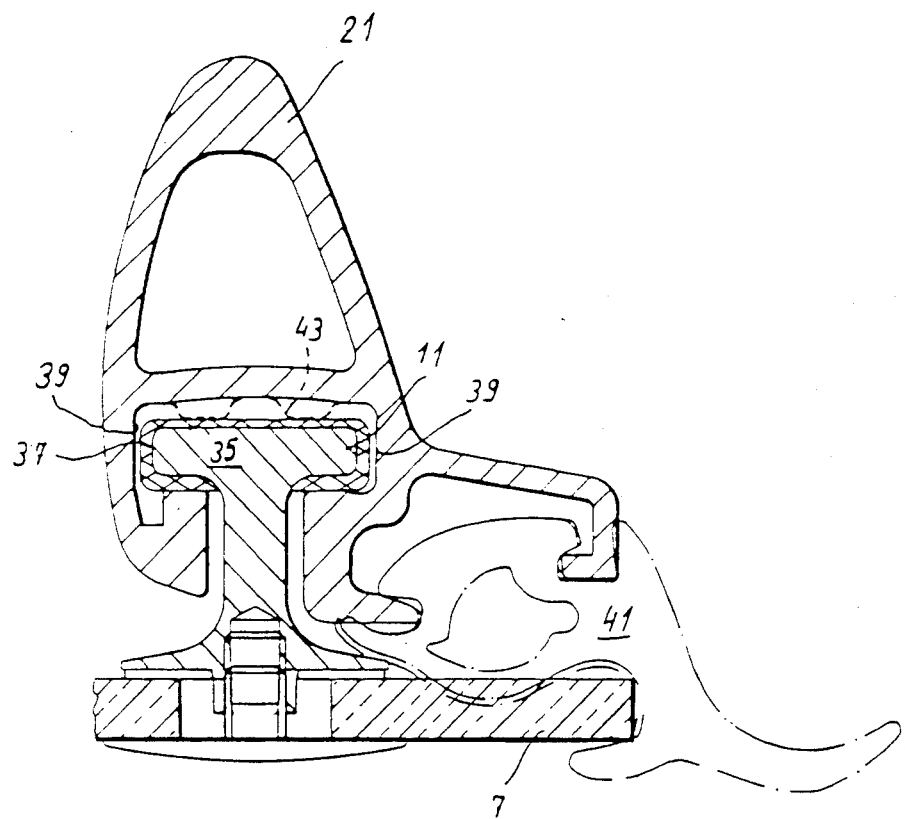
FIG. 4 is a sectional view along line IV—IV in FIG. 2, of the guidance of the pane.

FIG. 4 is a sectional view of the guidance of the pane 7 in the area of the slide member 11. A circular head 35 of the slide member 11 is coated with a low-friction material 37 and is positioned in the channel guide 21 which may be extrusion molded. Mounting of the head 35 in the channel guide 21 is such that the slide member 11 may be rotated therein as well as moved in a direction of the vertical axis of the vehicle (two degrees of freedom). The slide member 11 is restrained from moving in a direction longitudinal of the vehicle by engagement with two flanks 39 integral with the channel guide 21. Restraint of the slide member 11 in a direction transverse of the vehicle is imposed either by a gasket 41 attached to the channel guide 21 or by guide rails 43

(shown in broken lines) integrally formed in the channel guide 21 in an appropriate position.

FIG. 5 depicts a section through the slide member 9 constituting a third point of guidance providing three degrees of freedom (rotation as well as movement in directions vertical and longitudinal of the vehicle). The arrangement of the slide member 9 is similar to that described supra in connection with slide member 11. A circular head 47 of the slide member 9 is coated with a low-friction material 49 and is received within a groove provided in the channel guide 19. The arrangement is such that the slide member 9 may not only rotate about its longitudinal axis within the channel guide 19, but it may also move therein in directions vertical and longitudinal of the vehicle. To permit such longitudinal movement, the channel guide 19, which is preferably extrusion molded, is provided with flanks 45 spaced at some distance from the periphery of the head 47 of the slide member. The flanks 45 extend into shoulders 55 located on opposite sides of the shank of the slide member 9, but at some distance therefrom. Movement of the slide member 9 in a direction transverse of the vehicle is restrained by engagement of sections 53 of the groove with opposite axial surfaces of the head 47 of the slide member 9.

By providing guidance to a window pane at three points only while at the same time establishing as many degrees of freedom as the function of each point of guidance permits, the device in accordance with the invention avoids redundancy in the elements otherwise necessary to establish firm yet smooth guidance of the pane. This results in a significant simplification in the assembling of the pane within a door of a vehicle owing to greater tolerances between the interfitting components of the guidance system.

It will thus be seen that the objects set forth above and the problem to be solved by the invention, among those made apparent from the preceding description, have been attained efficiently. Since certain changes may be made in carrying out, and in the construction of the device of, the invention without departing from its scope, all matter contained in the above description or shown in the accompanying drawings is to be interpreted as illustrative only and not as limiting in any sense.

It is also to be understood that the appended claims are intended to cover all the generic and specific features of the invention herein described, and all statements of scope of the invention which as a matter of language might be said to fall therebetween.

Having described the invention, what is claimed as new and secured by Letters Patent is set forth in the appended claims.

We claim:

1. An apparatus for guiding a window pane of a vehicle between open and closed positions, comprising:
   means for movably supporting the pane;
   means for moving the pane between the open and closed positions;
   first and second means for connecting the pane the the supporting means; and
   third means for connecting the pane to the moving means;
   the first, second and third connecting means comprising means for guiding the pane in directions substantially normal to its surface and for providing rotational movability to the pane about an axis extending substantially normal to the surface surrounding the first, second and third connecting means, the first and third connecting means further comprising means for guiding the pane in directions substantially parallel to its surface and normal to its direction of movement between the open and closed positions, the third means comprising means for guiding the pane in the direction of its movement between the open and closed positions, and the second means comprising means for guiding the pane solely in directions substantially normal to the surface of the pane.

2. The apparatus of claim 1, wherein the third means is located adjacent a margin of the pane extending substantially normal to the direction of movement between the open and closed positions.

3. The apparatus of claim 2, wherein the third means comprises a lug for connecting the pane to the moving means.

4. The apparatus of claim 3, wherein the moving means comprises a cable connected to a crank.

5. The apparatus of claim 4, wherein the lug is slideably mounted in an elongated guide member.

6. The apparatus of claim 1, wherein the first and second connecting means are adapted to permit movement of the pane in a direction substantially parallel to its surface.

7. The apparatus of claim 6, wherein the first and second connecting means comprise slide members affixed to the pane and received in elongated guide members extending substantially parallel to the direction of movement between open and closed positions.

8. The apparatus of claim 7, wherein the slide members comprise head members offset from the surface of the pane and provided with shoulders extending substantially parallel thereto.

9. The apparatus of claim 8, wherein each elongated guide member comprises a groove for receiving a head member.

10. The apparatus of claim 9, wherein the groove of the elongated guide member associated with the head member of the first connecting means has a cross-sectional profile substantially corresponding to the profile of the head member in longitudinal section.

11. The apparatus of claim 9, wherein the groove of the elongated guide member associated with the head member of the second connecting means has a profile wider than the profile of the head member in longitudinal section thereby providing movability of the head member within the groove in a direction normal to its longitudinal axis.

12. The apparatus of claim 1, wherein the pane is curved about two orthogonal axes.

* * * * *